Aug. 22, 1939.  B. W. JONES  2,170,688
REMOTE CONTROL SYSTEM
Filed Oct. 16, 1934

Inventor:
Benjamin W. Jones,
by Harry E. Dunham
His Attorney.

Patented Aug. 22, 1939

2,170,688

UNITED STATES PATENT OFFICE 2,170,688

REMOTE CONTROL SYSTEM

Benjamin W. Jones, Schenectady, N. Y., assignor to General Electric Company, a corporation of New York Application October 16, 1934, Serial No. 748,503

24 Claims. (Cl. 219—8)

My invention relates to remote control systems.

It is an object of my invention to provide a system in which a characteristic of the source of supply may be altered by means of a control circuit completed through a load circuit connected to said source of supply.

It is a further object of my invention to provide a control system in which, by the insertion of a rectifier in the load circuit, the operation of a polarized relay in an alternating current circuit completed through the load circuit is employed for altering or reversely altering a characteristic of the source of supply to which said load circuit is connected.

Figure 1:
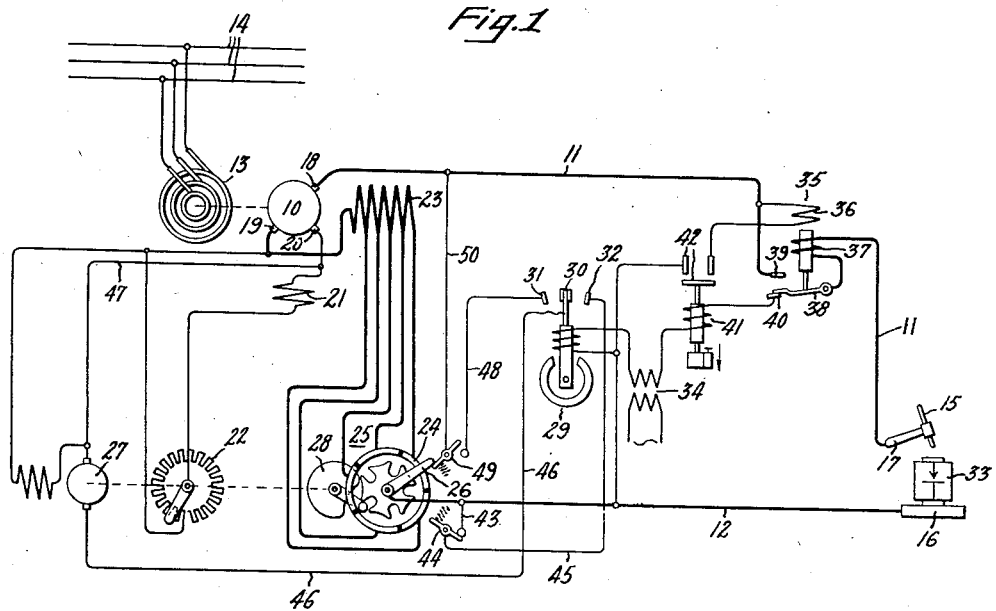
Figure 2:
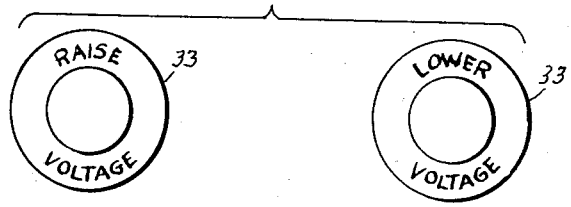

Further objects of my invention will become apparent from the following description taken in connection with the accompanying drawing, Fig. 1 of which diagrammatically represents a system embodying my invention and Fig. 2 of which shows opposite end views of the portable rectifier used for operating the system.

The system shown in the drawing comprises a generator 10 which is connected to a load device through load conductors 11 and 12. This generator is driven by a motor 13 mechanically connected thereto, and electrically connected to an alternating current source of supply 14.

The particular system illustrated is an arc welding system in which the load device comprises an arc which is established between an electrode 15 and the work to be welded 16. The work is connected to the generator 10 through welding conductor 12 and the electrode 15 is held in a welding tool or electrode holder 17 by means of which current is supplied thereto through welding conductor 11.

The generator illustrated in the drawing is of the type described and claimed in United States Letters Patent No. 1,340,004, Sven R. Bergman, granted May 11, 1920. In this type of generator the output voltage of the generator is the algebraic sum of the voltages between two main brushes 18 and 19, and an auxiliary brush 20. The electromotive force between the brushes 19 and 20 is substantially constant while the electromotive force between brushes 18 and 20 changes in value and direction in accordance with the condition of the arc. The generator is illustrated as having a shunt field 21 connected through a rheostat 22 to the substantially constant potential between brushes 19 and 20 and a series field 23 provided with taps which are connected to segments 24 of the tap switch 25, the position of the arm 26 of which determines the number of series field turns connected in the welding circuit 11, 12.

The rheostat 22 and tap switch 25 are mechanically connected to and driven by a pilot motor 27. The tap switch 25 is operated through a Geneva movement 28 to change the number of turns of the field 23 connected in the load circuit at the time the rheostat 22 changes from a maximum to a minimum or a minimum to a maximum position, due to the rotation imparted thereto by motor 27. By thus controlling the fields of the generator 10 a wide range of adjustment is provided.

The operation and direction of rotation of the pilot motor 27 is under the control of a polarized relay 29. The relay illustrated is provided with a movable contact 30 and fixed contacts 31 and 32. When the contacts 30 and 31 are closed the motor 27 is connected for one direction of rotation across brushes 18 and 20 of generator 10 and when contacts 30 and 32 are closed, this motor is connected across brushes 19 and 20 of generator 10 for the opposite direction of rotation.

The operating coil of the relay 29 is connected in an alternating current circuit arranged to be completed through the conductors 11 and 12, and a rectifier 33 which may be connected between the welding conductors. This connection may be obtained by placing one terminal of a portable rectifier 33 on the work 16 and touching the other terminal of the rectifier with the electrode 15. The rectifier may be of any suitable type, but I prefer to employ one of the surface contact types such as exemplified by the copper oxide rectifier. The operation of the polarized relay 29 will depend upon the manner in which the rectifier 33 is connected in circuit therewith. When connected in one direction in the circuit, the relay 29 will close one set of contacts and when the rectifier is reversed in the circuit, the relay will close its other set of contacts. The ends of the rectifier may be provided with legends as shown in Fig. 2 to inform the operator in what manner the rectifier is to be connected in the welding circuit to accomplish a raising or lowering of the generator voltage. Thus when the rectifier is placed on the work, its exposed upper end indicates the manner in which the system will operate when the welding circuit is completed through it. Alternating current is supplied to the circuit in which the operating coil of the relay 29 is connected through a transformer 34 which is connected to a suitable source of supply.

The connection of conductors 11 and 12 to the generator 10 is completed through a switch 35 having an operating coil 36 and a holding coil 37 which is connected in series with the conductors 11 and 12 when its movable contact 38 engages its main contact 39. When switch 35 is de-energized, its movable contact extends the alternating current circuit for polarized relay 29 through a back contact 40 to include the welding conductor 11 which is attached to the electrode 15 through the agency of the electrode holder 17.

In the alternating current circuit in which the polarized relay 29 is connected there is also connected a relay 41 which when energized connects through its contacts 42 the operating coil 36 of switch 35 to the brushes 18 and 19 of generator 10 through conductors 11 and 12, tap switch 25 and series field 23 of the generator. The characteristics of the relay 41 are such that it is not operated by the rectified current permitted to flow through its operating coil and the operating coil of the polarized relay 29 when the rectifier 33 is inserted in circuit therein. This relay 41 will operate, however, when its circuit is completed by touching the electrode 15 directly to the work 16. It has a time delay opening characteristic so that once it is operated it will maintain its contacts closed for a sufficient period of time to maintain switch 35 in its closed position long enough to enable the operator to strike a welding arc to which current is supplied from the generator 10 when the switch 35 is in its closed position.

The system illustrated in the drawing will be better understood from a consideration of its operation.

In the drawing, the switches and relays are illustrated in their deenergized positions and the rheostat 22 and tap switch 25 in their positions for maximum excitation of the generator 10.

If upon initiating a welding operation the operator finds that the voltage of the generator 10 is too great for the operation he wishes to perform, the voltage of the generator may be reduced as follows: The rectifier 33 will be connected between the welding conductors 11 and 12 so as to operate the polarized relay 29 to a position in which its contacts 30 and 32 are closed. Suitable identifying means on the rectifier 33 or its casing as shown in Fig. 2, will indicate to the operator which terminal of the rectifier is to be placed in engagement with the work and which terminal is to be touched by the electrode 15 in order to accomplish this operation. It is, of course, understood that the rectifier, depending upon its connection in the alternating current circuit in which the polarized relay 29 is located, will permit only the passage of positive or negative half waves and that, for example, the positive half waves will operate the polarized relay to a position in which contacts 30 and 32 are closed, and that the negative half waves will operate this relay to a position in which its contacts 30 and 31 are closed. The closure of contacts 30 and 32 connects pilot motor 27 across the brushes 19 and 20 of the generator 10 through the following circuit: From brush 19 through field 23 of generator 10, tap switch 25, conductors 12 and 43, limit switch 44, conductor 45, contacts 30 and 32 of polarized relay 29 and conductors 46 and 47 to brush 20 of the generator 10. The motor 27 when thus connected will operate first to increase the resistance in circuit with the shunt field 21 of the generator and after having inserted all of this resistance will operate the tap switch 25 to decrease the number of turns of the series field 23 connected in the welding circuit. This operation can be continued by maintaining the circuit of the relay 29 through the rectifier 33 until the voltage of the generator 10 is reduced to a minimum when, through the operation of the limit switch 44 by arm 26 of tap switch 25, the operating circuit of the pilot motor 27 will be interrupted. If the operator desires to raise the voltage of the generator from a lower value to a higher value, the position of the rectifier 33 between the welding conductors 11 and 12 is reversed. With this connection the polarized relay 29 will close its contacts 30 and 31, completing an operating circuit for the pilot motor 27 as follows: From brush 20 of the generator 10 through conductors 47 and 46, contacts 30 and 31 of polarized relay 29, conductor 48, limit switch 49, and conductors 50 and 11 to brush 18 of the generator 10. This adjustment may be continued until the arm 26 of the tap changing switch 25 operates the limit switch 49, thereby interrupting the circuit of the pilot motor 27.

After the operator has secured the voltage adjustment which he desires the electrode 15 is placed in engagement with the work 16 and as a result of the current flow in the alternating current circuit by reason of this connection relay 41 will operate to close its contacts 42. The closure of these contacts will connect the operating coil 36 of the switch 35 to brushes 18 and 19 of the generator 10 through conductors 11, 12, tap switch 25, and series field 23. The switch 35 will be maintained closed for an appreciable length of time due to the delayed opening characteristics of relay 41 during which time the operator will have sufficient opportunity to strike the welding arc. Once the arc has been maintained the switch 35 will be held in its closed position by reason of the flow of current through its series holding coil 37.

Although I have illustrated in the drawing a system in which my invention has been applied to a welding generator of particular construction, it is to be understood that it is not limited in its application to such machines. As has been pointed out above, the brush 20 of the generator above described is at a potential intermediate that of the brushes 18 and 19 and when my invention is used in connection with generators not provided with such a third brush, the same results can be obtained by connecting one terminal of the pilot motor 27 to a source of potential intermediate the potential of the terminals of the source of supply. This can be very readily accomplished through the use of a potentiometer circuit obtained by connecting a resistance across the terminals of the source of supply and connecting one terminal of the pilot motor 27 to an intermediate point on this resistor.

Alternating current may be supplied to the control circuits of relays 29 and 41 by any suitable means. The transformer 34 illustrated in the drawing is only one of several means for accomplishing this purpose. This transformer may be connected to the source of supply 14 in the system illustrated. In some systems where a prime mover is employed for driving the generator, the generator may be provided with auxiliary slip rings connected to the armature winding in such a way as to obtain an alternating current potential across the slip rings.

Various modifications of my invention will occur to those skilled in the art in view of the particular embodiment above illustrated and described. It is to be understood, therefore, that I intend to cover all such modifications as fall within the true spirit and scope of my invention as pointed out in the claims annexed hereto.

What I claim as new and desire to secure by Letters Patent of the United States is:

1. A power system comprising a source of supply, load conductors connected to said source of supply, means for completing a circuit through said load conductors independently of said source of supply, means for supplying alternating current to said circuit, means including a polarized relay in said circuit for altering or reversely altering a characteristic of said source of supply, and means including a rectifier arranged to be connected to said load conductors for controlling the operation of said polarized relay.

2. A power system comprising a source of supply, a load device, load conductors connected between said source of supply and said load device, means for completing a circuit through said load conductors independently of said source of supply, means for supplying alternating current to said circuit, means including a polarized relay in said circuit for altering or reversely altering a characteristic of said source of supply, and means including a portable rectifier arranged to be connected between said load conductors in place of said load device for controlling the operation of said polarized relay.

3. A power system comprising a source of supply, a load device, load conductors connected between said source of supply and said load device, means for completing a circuit through said load conductors independently of said source of supply, means for supplying alternating current to said circuit, means including a polarized relay in said circuit for altering or reversely altering a characteristic of said source of supply, and means including a portable rectifier having terminals adapted to be connected to said load conductors for controlling the operation of said polarized relay and said characteristic altering means.

4. A power system comprising a generator, a load device, load conductors connecting said load device to said generator, means for completing a circuit through said load conductors independent of said generator, means for supplying an alternating current to said circuit, means including a polarized relay in said circuit for raising or lowering the voltage of said generator, means including a portable rectifier arranged to be inserted between said load conductors in place of said load device for controlling the operation of said polarized relay, and identifying means associated with said rectifier for indicating to an operator the manner in which said rectifier is to be connected between said load conductors for raising or lowering the voltage of said generator.

5. A power system comprising a generator, a load device, load conductors, means for completing the connection through said load conductors to said generator, means for completing a circuit through said load conductors independently of said generator, means for supplying alternating current to said circuit, means including a polarized relay in said circuit for raising or lowering the voltage of said generator, means including a rectifier arranged to be connected between said load conductors for controlling the operation of said polarized relay and said generator voltage raising or lowering means, and means including a relay in said alternating current circuit for operating said connection completing means for the circuit through said load conductors to said generator when said load conductors are connected to one another independently of said rectifier.

6. A power system comprising a source of supply, load conductors, means for completing the connection of said load conductors to said source of supply, means for completing a circuit through said load conductors independently of said source of supply, means for supplying alternating current to said circuit, means including a polarized relay in said circuit for altering or reversely altering a characteristic of said source of supply, means including a rectifier arranged to be connected to said load conductors for controlling the operation of said polarized relay, and means including a relay in said circuit for operating said circuit completing means when said load conductors are connected to one another independently of said rectifier.

7. A power system comprising a source of supply, a source of potential intermediate the potential of the terminals of said source of supply, means for altering or reversely altering a characteristic of said source of supply, means for operating said last mentioned means including an electric motor, one terminal of which is connected to said source of intermediate potential, load conductors connected to said source of supply, means for completing a circuit through said load conductors independently of said source of supply, means for supplying alternating current to said circuit, means including a polarized relay connected in said alternating current circuit for connecting the other terminal of said motor to one or the other of the terminals of said source of supply, and means including a rectifier arranged to be connected to said load conductors for controlling the operation of said polarized relay.

8. A power system comprising a generator having main brushes and an auxiliary brush the potential of which is intermediate the potential of said main brushes, means for raising or lowering the voltage of said generator, means for operating said last mentioned means including an electric motor having one terminal connected to the auxiliary brush of said generator, load conductors connected to the main brushes of said generator, means for completing a circuit through said load conductors independently of said generator, means for supplying alternating current to said circuit, means including a polarized relay connected in said alternating current circuit for connecting the other terminal of said motor to one or the other of the main brushes of said generator, and means including a rectifier arranged to be connected to said load conductors for controlling the operation of said polarized relay.

9. A power system comprising a source of supply, a source of potential intermediate the potential of the terminals of said source of supply, means for altering or reversely altering a characteristic of said source of supply, means for operating said last mentioned means including a motor one terminal of which is connected to said source of intermediate potential, load conductors connected to said source of supply, means for completing the connection of said load conductors to said source of supply, means for completing a circuit through said load conductors independently of said source of supply, means for supplying alternating current to said circuit, means including a polarized relay connected in said alternating current circuit for connecting the other terminal of said motor to one or the other of the terminals of said source of supply, means including a rectifier arranged to be connected to said load conductors for controlling the operation of said polarized relay, and means including a relay in said alternating current circuit for operating said circuit completing means when said load conductors are connected to one another independently of said rectifier.

10. A power system comprising a source of supply, a source of potential intermediate the potential of the terminals of said source of supply, means for altering or reversely altering a characteristic of said source of supply, means for operating said last mentioned means including an electric motor one terminal of which is connected to said source of intermediate potential, load conductors connected to said source of supply, means including a polarized relay for completing the circuit of said motor through its other terminal to one or the other of the terminals of said source of supply, means for limiting the operation of said characteristic altering means to minimum and maximum positions comprising limit switches connected in said motor circuit between said polarized relay and the terminals of said source of supply, and means including a rectifier arranged to be connected to said load circuit for controlling the operation of said polarized relay.

11. A power system comprising a generator, a source of potential intermediate the potential of the terminals of said generator, means for raising or lowering the voltage of said generator, means for operating said last mentioned means including an electric motor having one terminal connected to said source of intermediate potential, load conductors connected to said generator, means for supplying alternating current to said conductors, means including a polarized relay for completing a circuit from the other terminal of said motor to one or the other of the terminals of said generator, limit switches connected in said motor circuit between said polarized relay and the terminals of said generator, means for operating one or the other of said limit switches through which said motor circuit is completed when said voltage controlling means is in the position it occupies for the maximum or the minimum excitation of said generator, and means including a rectifier arranged to be connected between said load conductors for controlling the operation of said polarized relay.

12. Apparatus comprising a generator whose output voltage is the algebraic sum of the voltages between each of its two main brushes and an auxiliary brush, means for raising or lowering the voltage of said generator, means for operating said last mentioned means including an electric motor having one terminal connected to the auxiliary brush of said generator, load conductors connected to said generator, means for completing the connection of said load conductors to said source of current, means for completing a circuit through said load conductors independently of said generator, means for supplying alternating current to said circuit, means including a polarized relay connected in said alternating current circuit for connecting the other terminal of said motor to one or the other of the main brushes of said generator, means including a rectifier arranged to be connected between said load conductors for controlling the operation of said polarized relay, and means including a relay in said alternating current circuit for operating said circuit completing means when said load conductors are connected to one another independently of said rectifier.

13. A remote control system for a direct current generator comprising, in combination, a load circuit for the generator, control means operable to either increase or decrease the output of the generator, a source of control frequency, means for applying different portions of the control frequency to said load circuit, and means responsive to the application of the different portions of said control frequency to the load circuit for selectively operating said control means.

14. A remote control system for a direct current generator comprising, in combination, a load circuit for the generator, control means operable to either increase or decrease the output of the generator, a source of control frequency, means for supplying half cycles of the control frequency to selectively apply either positive or negative half cycles to said load circuit, and means responsive to the application of the positive or negative half cycles of said control frequency for selectively operating said control means.

15. A remote control system for a direct current generator comprising, in combination, a load circuit for the generator, control means operable to either increase or decrease the output of the generator, means for generating a control frequency, means for selectively applying either positive or negative half cycles of the control frequency to said load circuit, and means responsive to the application of the different half cycles of said control frequency for selectively operating said control means.

16. A remote control system for a direct current generator comprising, in combination, a load circuit for the generator, control means operable to either increase or decrease the output of the generator, a source of positive and negative half cycles, polarized relay means disposed to be responsive to the application to said load circuit of said positive or negative impulses for selectively operating said control means, and means for selectively applying to the load circuit said impulses for effecting the functioning of said control means.

17. A remote control system comprising, in combination, a direct-current generator, a load circuit for the generator, control means disposed to change the output of the generator, means for connecting a source of control frequency to said load circuit, and means disposed to be responsive to the application of said control frequency to said load circuit for operating said control means.

18. In a welder, a welding generator, a welding circuit having a work piece and an electrode, said circuit being normally inoperative, a controlling circuit connected into said welding circuit, a switch adapted to open one of said circuits while closing the other, means actuated by said control circuit responsive to engagement of the electrode with the work for effecting the closure of the welding circuit and the opening of the control circuit, and means separate from the welding circuit for supplying electrical energy to the control circuit.

19. In a motor generator welding set, a supply circuit to the motor generator, a welding circuit supplied by the generator having an electrode and work piece therein, a welding control circuit connected with the welding circuit, a circuit selecting switch for the welding and welding control circuits, and means controlled by the application of the electrode to the work for operating the selecting switch to render the welding circuit operative and concurrently to render the control circuit inoperative.

20. In a motor generator welding set, a supply circuit to the motor generator, a welding circuit supplied by the generator having an electrode and work piece therein, a welding control circuit connected with said welding circuit, a circuit selecting switch for said welding and welding control circuits, means controlled by the application of said electrode to said work for operating said selecting switch to render said welding circuit operative and said control circuit inoperative and controlled by the removal of said electrode from said work for operating said selecting switch to render said welding circuit inoperative and said control circuit operative.

21. In a motor generator welding set, a supply circuit to the motor generator, a welding circuit supplied by the generator having an electrode and work piece therein, a welding control circuit connected with said welding circuit, a circuit selecting switch for said welding and welding control circuits, means controlled by the application of said electrode to said work for operating said selecting switch to render said welding circuit operative and said control circuit inoperative and controlled a predetermined time after the removal of said electrode from said work for operating said selecting switch to render said welding circuit inoperative and said control circuit operative.

22. In a welder, a welding circuit supplied by a generator and including an electrode and the work, an interconnected control circuit to the welding circuit including said electrode and said work, a switch arranged alternately to open said control circuit while closing said welder circuit and to open said welder circuit while closing said control circuit, a switch operating circuit, a source of electrical energy therefor, a source of electrical energy for said control circuit, and means operated by said control circuit for controlling said switch operating circuit.

23. In a welder, a welding circuit supplied by a generator and including an electrode and the work, an interconnected control circuit to the welding circuit including said electrode and said work, a switch arranged alternately to open said control circuit while closing said welder circuit and to open said welder circuit while closing said control circuit, a switch operating circuit, a source of electrical energy therefor, a source of electrical energy for said control circuit, and means operated by said control circuit for controlling said switch operating circuit, said means opening said switch operating circuit a predetermined time after completing it unless a circuit is completed through said electrode and said work.

24. A remote control system comprising, in combination, a direct-current generator disposed to be connected to a load circuit, said generator having a main field winding, a rheostat connected to vary the exciting current in said field winding, a motor for actuating the rheostat, means for applying a control frequency to said load circuit, and means disposed to be responsive to the application of said control frequency to said load circuit for controlling the operation of the rheostat-actuating motor.

BENJAMIN W. JONES.

CERTIFICATE OF CORRECTION.

Patent No. 2,170,688.   August 22, 1939.

BENJAMIN W. JONES.

It is hereby certified that error appears in the printed specification of the above numbered patent requiring correction as follows: Page 3, first column, line 36, claim 3, strike out the words "supply, means for supplying alternating current" and insert the same after "of" second occurrence, line 37, same claim; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.